United States Patent
Jones et al.

(10) Patent No.: US 10,536,822 B1
(45) Date of Patent: *Jan. 14, 2020

(54) IDENTIFYING PURPOSE AND CONTEXT OF A LINE OF PEOPLE

(71) Applicant: International Business Machines Corporation, Armonk, NY (US)

(72) Inventors: Andrew R. Jones, Round Rock, TX (US); Christian B. Compton, Austin, TX (US); Gregory J. Boss, Saginaw, MI (US); Jeremy R. Fox, Georgetown, TX (US); John E. Moore, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,057

(22) Filed: Jun. 6, 2019

Related U.S. Application Data

(63) Continuation of application No. 16/183,966, filed on Nov. 8, 2018, now Pat. No. 10,362,459.

(51) Int. Cl.
*H04W 4/20* (2018.01)
*H04W 48/12* (2009.01)

(52) U.S. Cl.
CPC ............ *H04W 4/20* (2013.01); *H04W 48/12* (2013.01)

(58) Field of Classification Search
CPC ................................ H04W 4/20; H04W 48/12
See application file for complete search history.

(56) References Cited

U.S. PATENT DOCUMENTS

| 4,398,257 A | 8/1983 | Paganini |
| 5,502,806 A | 3/1996 | Mahoney |
| 6,529,786 B1 | 3/2003 | Sim |
| 9,456,309 B2 * | 9/2016 | Zises ............... H04W 4/029 |

(Continued)

FOREIGN PATENT DOCUMENTS

| WO | 2010026521 A1 | 3/2010 |
| WO | 2012170958 A1 | 12/2012 |

OTHER PUBLICATIONS

Brandom, "The US Border Patrol is trying to build face-reading drones", The Verge, Apr. 6, 2017, 5 pages, https://www.theverge.com/2017/4/6/15208820/customs-border-patrol-drone-facial-recognition-silicon-valley-dhs.

(Continued)

*Primary Examiner* — Brandon J Miller
(74) *Attorney, Agent, or Firm* — Michael A. Petrocelli

(57) ABSTRACT

A method, system, and computer program product is disclosed for identifying the purpose and context of a line of people using mobile devices. A message is generated for transmitting to one or more mobile devices, and the message identifies a purpose of a line of people. The message is transmittable using a beacon at a starting point of the line. The message includes the purpose of the line to a first mobile device of a first person in the line. The message transmitted by the beacon is receivable by at least the first mobile device. In sequence, the message is transmitted, to each of a plurality of mobile devices belonging to people in the line, from the first mobile device to a next mobile device of the plurality of mobile devices, thereby relaying the message including the purpose of the line to multiple mobile devices, respectively.

20 Claims, 8 Drawing Sheets

(56) References Cited

U.S. PATENT DOCUMENTS

| | | | |
|---|---|---|---|
| 9,479,467 B2* | 10/2016 | Barlow | H04L 51/36 |
| 2004/0158482 A1 | 8/2004 | Hale | |
| 2005/0065834 A1 | 3/2005 | Hale | |
| 2011/0273312 A1 | 11/2011 | Eggleton | |
| 2015/0186957 A1* | 7/2015 | Barr | G06Q 30/0281 |
| | | | 705/346 |
| 2016/0012375 A1 | 1/2016 | Hanson | |
| 2016/0021507 A1* | 1/2016 | Gaines | H04W 4/023 |
| | | | 455/456.2 |
| 2016/0255475 A1 | 9/2016 | Maguire | |
| 2017/0054849 A1* | 2/2017 | Torre | H04M 3/5191 |
| 2017/0341746 A1 | 11/2017 | Erickson | |

OTHER PUBLICATIONS

Crowdvision, "Solutions for Airports: Automated passenger tracking using video analytics", Accessed Mar. 9, 2018, 5 pages, https://www.crowdvision.com/solutions-airports/.

Denman et al., "Automatic surveillance in transportation hubs: No longer just about catching the bad guy", Expert Systems with Applications, vol. 42, (2015), pp. 9449-9467.

Fox, et al., "Checking Credentials Using a Drone", U.S. Appl. No. 16/183,991, filed Nov. 8, 2018.

Gethover, "Hover Camera Passport", Accessed on Apr. 23, 2018, 6 pages, https://gethover.com/hover-camera-passport?d=pc.

HLS, "Airports in The US Purchase Queue Management Services", Nov. 13, 2016, 4 pages, <https://i-hls.com/archives/72878>.

Hsu et al., "Face Recognition on Drones: Issues and Limitations", DroNet' 15, May 18, 2015, pp. 39-44.

List of IBM Patents or Patent Applications Treated as Related, Filed Jun. 6, 2019, 2 pages.

Mayhew, "Face-Six releases facial recognition software for drones", Biometric Update, Dec. 12, 2017, 6 pages, https://www.biometricupdate.com/201712/face-six-releases-facial-recognition-software-for-drones.

Mell et al., "The NIST Definition of Cloud Computing", Recommendations of the National Institute of Standards and Technology, NIST Special Publication 800-145, Sep. 2011, 7 pages.

Saeed et al., Argus: Realistic Target Coverage by Drones, The Proceedings of the 16th ACM/IEEE International Conference on Information Processing in Sensor Networks, Apr. 2017, pp. 155-166.

* cited by examiner

IDENTIFYING PURPOSE AND CONTEXT OF A LINE OF PEOPLE

BACKGROUND

The present disclosure relates to a method and system for identifying a purpose and context of a line of people waiting in a line or queue, and more specifically, identifying and conveying information regarding the line of people to the people in the line using mobile devices.

Typical waits in a common area, such as a line (also known as a queue) of people waiting for services, check-out, check-in, can be time consuming. Such common areas can include, for example, airports, or other modes of transportation, or shopping malls, or many other venues where people line up to enter, check out, complete a transaction or wait for services. For example, line or queues of people can include lining up to check out or complete a transaction such as in a shopping mall, or lines of people to check in, such as at a hotel, or to purchase a ticket, such as for a movie. Further examples of people forming lines or queues can include lines occurring at an airport or customs area. One common concern in many examples and venues it a person can enter a line and wait in a line, and not be sure if they are on or in the correct line, or waiting on the line only to find out that they are not on the correct line or queue. It is understood that the correct line is a line that the person intended to be in for reaching the destination point that the person intended. This can be frustrating, time consuming, and even cause more severe problems when meeting a time deadline or gaining entrance has a hard deadline, such as a flight time, causing a person expense, time loss, and missed opportunities.

Many situations or circumstances exist where an individual, person, or group of people, may approach long lines and be unsure which line they should join the line of people (e.g., at an airport during a major weather delay). It would therefore be beneficial for a system or process to assist in determining and/or confirm the purpose of a line to ensure that a person is on the correct line, or standing in the correct line, without having to walk to a front of the line to confirm the purpose/context of the line, or confirm with others in the line the purpose of the line, as other people on the line can also be mistaken as to the purpose of the line they are standing or waiting on.

For example, busy airports, train stations, entertainment venues, and other large events may all have long lines where people must wait their turn or wait in a queue. In one example, standing in a line can be troubling when a person learns they are in the wrong line after waiting a significant amount of time, resulting in loss of time for the person, as well as possible financial loss.

SUMMARY

The present disclosure recognizing the shortcomings and problems associated with entering or waiting on a line of people and not be sure of the purpose of the line or if waiting on the correct line. It would be desirable for a method and system to ensure a person in a line understands the purpose of the line via an electronic transmission to the person's mobile device, thereby confirming the context of the line. Such line identification is important for a person waiting or entering a line, and can save time, expense for the person. Thus, having a means to identify a purpose of a line that people are waiting in (or standing or queuing in a line) or entering, to identify or confirm the person is on the correct line based on the purpose of the line would be highly beneficial.

In one aspect according to the invention, a method for identifying the purpose and context of a line of people using mobile devices, includes: generating a message for transmitting to one or more mobile devices, the message identifying a purpose of a line of people, and the message being transmittable using a beacon at a starting point of the line; transmitting the message using the beacon, the message including the purpose of the line and being receivable by a first mobile device of a first person in the line; and transmitting the message, in response to the first mobile device receiving the message, in sequence to each of a plurality of mobile devices belonging to people in the line, from the first mobile device to a next mobile device of the plurality of mobile devices, thereby relaying the message including the purpose of the line of people to multiple mobile devices of the people in the line, respectively.

In another aspect according to the present invention, a system for identifying the purpose and context of a line of people using mobile devices, includes: a computer system comprising: a computer processor, a computer-readable storage medium, and program instructions stored on the computer-readable storage medium being executable by the processor, to cause the computer system to: generate a message for transmitting to one or more mobile devices, the message identifying a purpose of a line of people, and the message being transmittable using a beacon at a starting point of the line, the beacon communicating with the computer system; transmit the message using the beacon, the message including the purpose of the line and being receivable by a first mobile device of a first person in the line; and transmit, in response to the first mobile device receiving the message, in sequence to each of a plurality of mobile devices belonging to people in the line, from the first mobile device to a next mobile device of the plurality of mobile devices, thereby relaying the message including the purpose of the line of people to multiple mobile devices of the people in the line, respectively.

In another aspect of the present invention, a computer program product identifies the purpose and context of a line of people using mobile devices. The computer program product comprises a computer readable storage medium having program instructions embodied therewith, wherein the computer readable storage medium is not a transitory signal per se, and the program instructions are executable by a computer to cause the computer to perform a method, including: generating a message for transmitting to one or more mobile devices, the message identifying a purpose of a line of people, and the message being transmittable using a beacon at a starting point of the line; transmitting the message using the beacon, the message including the purpose of the line and being receivable by a first mobile device of a first person in the line; and transmitting, in response to the first mobile device receiving the message, in sequence to each of a plurality of mobile devices belonging to people in the line, from the first mobile device to a next mobile device of the plurality of mobile devices, thereby relaying the message including the purpose of the line of people to multiple mobile devices of the people in the line, respectively.

In other aspects according to the invention, a method identifies the purpose and context of a line of people using mobile devices. A message is generated for transmitting to one or more mobile devices, and the message identifies a purpose of a line of people. The message is transmittable using a beacon at a starting point of the line. The message is transmitted using a short distance communication protocol using the beacon. The message includes the purpose of the line to a first mobile device of a first person in the line. The beacon has a specified range, and the message transmitted by the beacon is receivable by at least the first mobile device. Transmitting the message, in sequence to each of a plurality of mobile devices belonging to people in the line, from the first mobile device to a next mobile device of the plurality of mobile devices. Thereby, the message is relayed, including the purpose of the line of people to multiple mobile devices of the people in the line, respectively.

In another aspect according to the present invention, a system for identifying the purpose and context of a line of people using mobile devices includes a computer system comprising: a computer processor, a computer-readable storage medium, and program instructions stored on the computer-readable storage medium being executable by the processor, to cause the computer system to: generate a message for transmitting to one or more mobile devices, the message identifying a purpose of a line of people, and the message being transmittable using a beacon at a starting point of the line, the beacon communicating with the computer system; transmit the message using a short distance communication protocol using the beacon, the message including the purpose of the line to a first mobile device of a first person in the line, the beacon having a specified range, and the message transmitted by the beacon being receivable by at least the first mobile device; and transmit, in sequence to each of a plurality of mobile devices belonging to people in the line, from the first mobile device to a next mobile device of the plurality of mobile devices, thereby relaying the message including the purpose of the line of people to multiple mobile devices of the people in the line, respectively.

In another aspect according to the present invention, a computer program product for identifying the purpose and context of a line of people using mobile devices includes the computer program product comprising a computer readable storage medium having program instructions embodied therewith. The computer readable storage medium is not a transitory signal per se, and the program instructions are executable by a computer to cause the computer to perform a method, comprising: generating a message for transmitting to one or more mobile devices, the message identifying a purpose of a line of people, and the message being transmittable using a beacon at a starting point of the line; transmitting the message using a short distance communication protocol using the beacon, the message including the purpose of the line to a first mobile device of a first person in the line, the beacon having a specified range, and the message transmitted by the beacon being receivable by at least the first mobile device; and transmitting, in sequence to each of a plurality of mobile devices belonging to people in the line, from the first mobile device to a next mobile device of the plurality of mobile devices, thereby relaying the message including the purpose of the line of people to multiple mobile devices of the people in the line, respectively.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
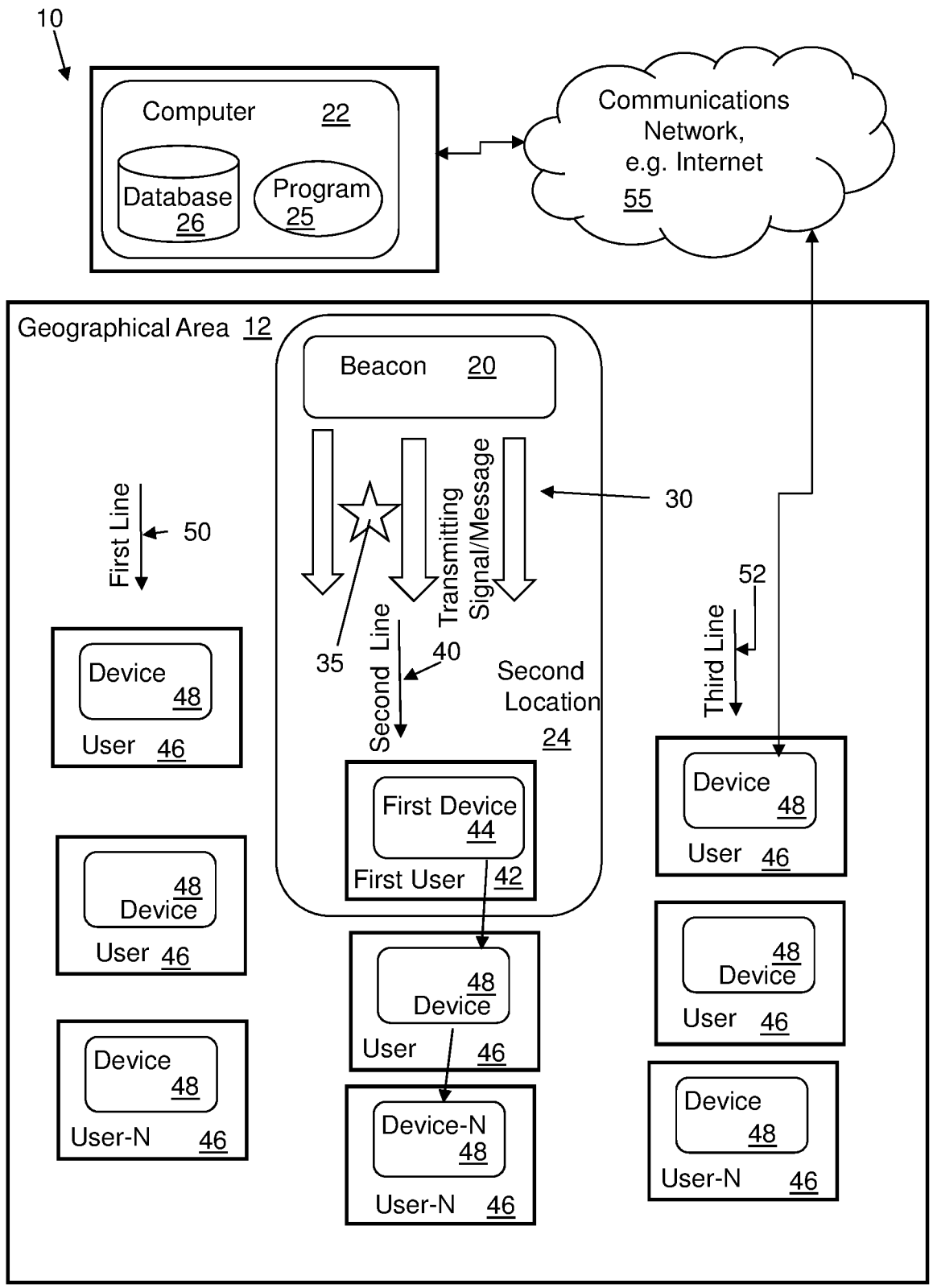
FIG. 1 is a schematic block diagram illustrating an overview of a system and methodology for identifying the purpose and context of a line of people using mobile devices, according to an embodiment of the disclosure.
Figure 2:
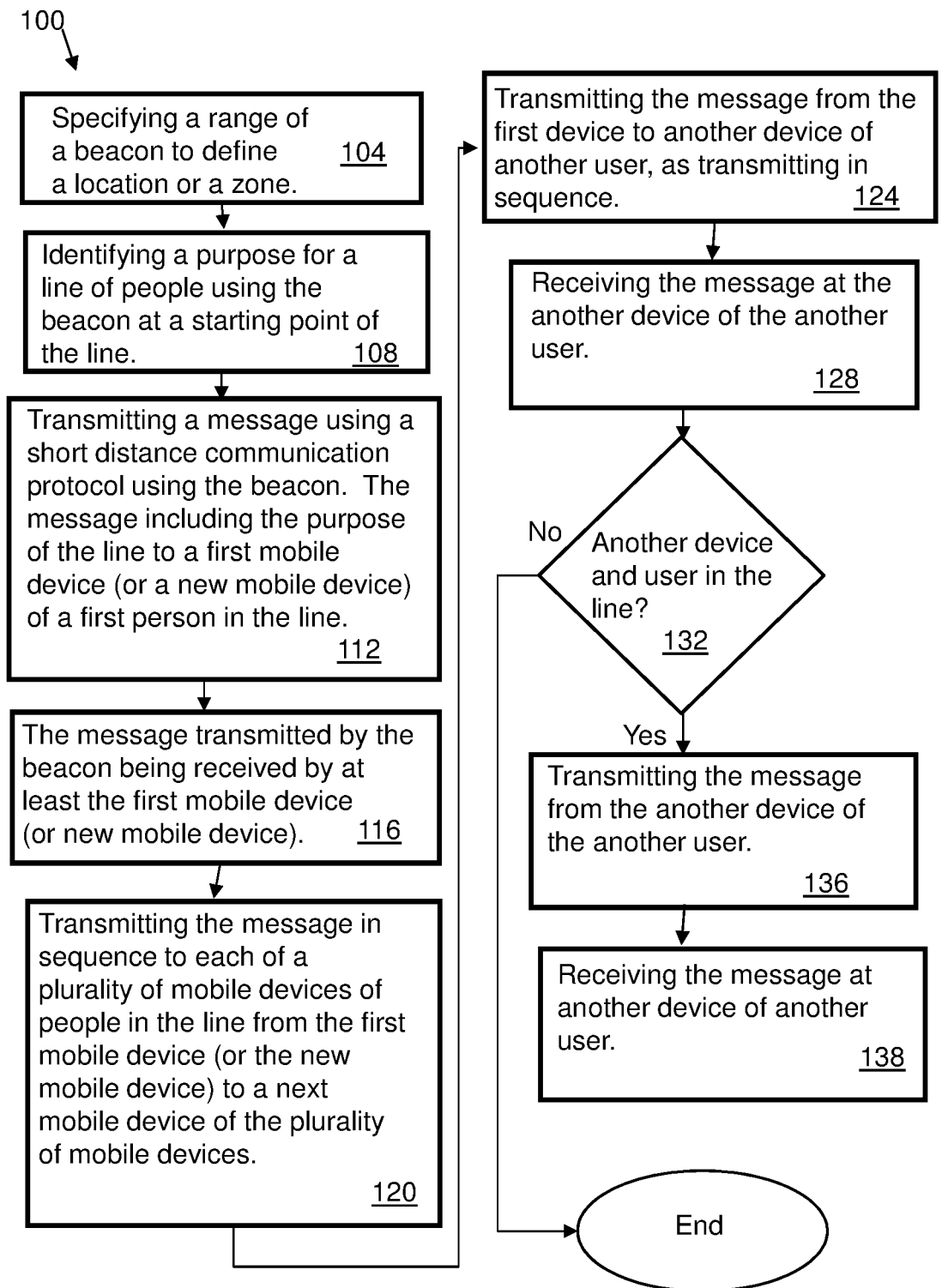
FIG. 2 is a flow chart illustrating a method, implemented using the system shown in FIG. 1, for identifying the purpose and context of a line of people using mobile devices, according to an embodiment of the disclosure.

Referring to FIGS. 1 and 2, a method 100 (FIG. 2) with reference to a system 10 (FIG. 1) according to an embodiment of the present disclosure is provided for identifying the purpose and context of a line of people and transmitting the purpose of the line to user mobile devices of people in or entering the line. The purpose and context of the line of people is communicated to the people on the line, so that the people on the line can confirm they are on the correct line. It is understood that the correct line is a line that the person intended to be in for reaching the destination point that the person intended.

Referring to FIG. 2, a beacon 20 is designed and configured to transmit a signal or message 30 within a specified range of the beacon, as in block 108. The beacon can be placed at a known line stating point or beginning. The method 100 includes identifying a purpose for a line of people, using the beacon 20 at a starting point or the beginning of the line, as in block 108. The beacon 20 designates the starting point of a line, in the embodiment of the disclosure shown in FIG. 1. In the embodiment of the disclosure shown in FIG. 1, the beacon 20 transmits to a second location 24 for a second line 40 of three lines, wherein the three lines include the second line 40 and a first line 50 and a third line 52. The second location 24 is an example of a specified range of the beacon 20, or also can be referred to as a transmitting area. The beacon can also be referred to as an originating sensor, and for example, be embodied as a device, mobile device, computer, drone, or other unit configured and capable of providing the functionality of the beacon described herein. The geographical area 12 can include a plurality of lines of people.

The beacon 20 is designed and configured to transmit a signal or message 30 within the specified range of the beacon (as in step 104), thus the beacon transmits to a specified line, in this case, the second line 40, and its vicinity designated by the second location 24. The message 30 (which is also referred to as a transmitted or transmitting signal/message) can be a transmitted using a designated protocol such as a short distance communication (PAN). The transmitted message 30 can be configured to communicate with any device, for example a mobile device, or a smartphone, or any IoT device via Internet of Things (IoT), within the specified range of the transmission, indicated as the second location 24 for the beacon 20. People queued (users 46), outside the second location 24 on other lines, for example, the first line 50 and the third line 52, do not receive the transmitted signal 30 on their respective mobile devices as not being at or within the second location 24. People queued (users 46) outside the second location 24, but on the second line 40 do not receive the transmitted signal 30 from the beacon 20 as they are outside the second location 24. However, people queued outside the second location but on the second line receive the transmitted signal (via their respective mobile devices) from other users on the second line as is explain herein.

The method 100 includes transmitting a message 30 (e.g., a transmitting signal/message in FIG. 1) using a short distance communication protocol using the beacon 20, as in block 112. The message includes the purpose of the line, for example, but not limited to, a text message, a notification, and/or a symbol, or other indication of the purpose of the line. A message and the length of the message can vary. For example, at an airport, the message can read, for example, 'Line for Flight 222', or in another instance 'check-in line for domestic flights'. The message can also include a timestamp. The timestamp can include the time of arrival in the line. For example, the timestamp can include the time the message was initiated for the next device in the line, by either the beacon or another mobile device. Thus, the timestamp identifies the time the next device was recognized and the next person entered the line.

The message is transmitted to at least a first mobile device of a first person in the line, which is generically depicted in FIG. 1 as a first user (or first person) 42 having a first device 44 (e.g., a mobile device) queuing in the second line 40. The first user 42 is in the second location 24, designated as the vicinity of the transmitting signal/message 30, and the message 30 transmitted by the beacon 20, is received by at least the first device 44 or first mobile device, as in block 116.

Additional users or persons in the line are depicted as additional users 46 and devices 48, for an N number of users and devices, the total number of users and devices in the line is denoted by device-N and user-N (FIG. 1). As discussed above the beacon 20 has a specified range depicted as the second location 24, and the transmitted message 30 by the beacon is receivable by at least the first device 44 of the first user 42.

The message is transmitted in sequence to each of a plurality of mobile devices of people in the line from the first mobile device to a next mobile device of the plurality of mobile devices, as in block 120. Thereby, the message is relayed from the first device 44 to the next device 48 in the line, and from the next device 48 to another device 48 for as many devices are in the line. Thereby, the purpose of the line is transmitted to all the devices 48-N in the line enabling the user or people in the line to ascertain or confirm the purpose of the line.

The transmitting in sequence (or relaying) including, in one embodiment of the present disclosure, transmitting from the first device to another device of another user, as in block 124. For example, the first device 44 can transmit the message, that is, relay or re-transmit the message 30, to another device 48 for another user 46, and in turn, the another user on the second line 40 can relay or re-transmit the message to another device for another user, for the length of the line or the number of users and devices on the line represented by device-N 48 and user-N 46.

In one example, each device 48 and user 46 in the second line relays to re-transmits the message 30 based on the proximity of another device and user to a device that has already received the message. For example, as discussed above, the message can be relayed from the first device 44 to the next device 48 in the line, and from the next device 48 to another device 48 for as many devices are in the line, based on proximity to the next device. For example, the proximity can be determined by a positioning application using GPS. For instance, when another device is within a specified range to the previous device which has received the message, the message is transmitted to the next device. Such specified range can be, for example, a two feet radius from the device which has already received the message.

Thus, the message is received at the another device 48 of the another user 46, as in block 128 of the method 100. Referring to block 132 of FIG. 2, the method determines if another device and another user are in the second line 40. When another device is detected at block 132, the method proceeds to transmit the message from the another device of the another user at block 136, and the message is received at another device of another user, as in block 138. When another device is not detected at block 132, the method ends.

Examples of Transmission Between Devices of Users

In one example, when there are a plurality of lines as first line 50, second line 40 and third line 52, the discussed short distance communication protocol (PAN) to communicate with or talk to any device (for example, an IoT device or smartphone) in the range of the beacon, to determine what the line purpose is associated with the beacon for that line. Each mobile device, such as a mobile phone, starting at the front of the line within the range of the beacon, would relay the line's purpose, via a communication message, to each mobile device that queries for the lines purpose. In one example, a mobile device can query a beacon for a transmitted signal/message. Such a query can be initiated from an application on the mobile device, or as part of a mapping application or GPS application on the mobile device.

In one example according to the present disclosure, an electronic formal handshake is not needed between devices relying a message or passing a token. For example, the token indicating the line purpose could be passed, and the processed by an application. In one example, wireless technology standard for exchanging data over short distances can be used for transmitting the message to a mobile device in range of the beacon, and subsequent transmission of the message from one mobile device to another.

A short range protocol or transmission method can be used when transmitting from device to device, such as from first device 44, to device 48, and device-N 48, and in one example, using a token, which will be explained in greater detail below. In one example, the message can be transmitted using an Internet of Things (IoT) protocol for reception and transmitting by the plurality of mobile devices.

Smart IoT devices can communicate from one device to another to provide context of the line (or a purpose of the line) to users of the lines, via their mobile devices, and provide context and purpose of the line to the users by dynamically communicating in real time. In one example, as a person enters or leaves a line, they can be alerted by a message of their status change regarding the line. The message can be initiated by an application on the person's mobile device, as part of or in conjunction with GPS or an application using GPS, which detects that the person is out of a range of another mobile device on the line.

Similarly, a smart devices short-range IoT protocol can be used to determine whether the person has left the line, and to initiate a notification, e.g., entering or leaving a line. Being out of range of another mobile device, or an IoT device, in the case that the IoT device is stationary, can be used to detect and determine that a person is out of range, and determine when a person is leaving a line. Similarly, being in range of another mobile device, or an IoT device, can be used to detect and determine that a person is in-range, and determine when a person I entering a line.

Example of Entering a Zone

Figure 3:
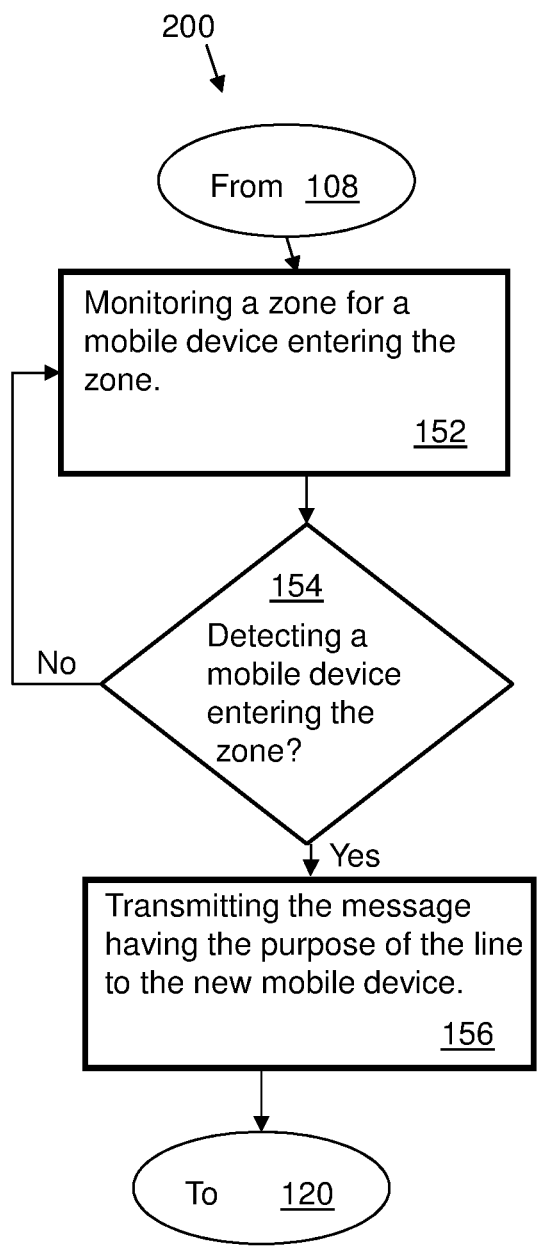
FIG. 3 is a flow chart illustrating another method continuing from the method from FIG. 2, for identifying the purpose and context of a line of people using mobile device, according to an embodiment of the disclosure.

Referring to FIG. 3, in one embodiment according to the present disclosure, a method 200 continues from block 108 of method 100, wherein the second location 24 can be a defined zone within a venue. The method 200 includes the beacon monitoring a zone for a mobile device entering the zone, as in block 152. The method 200 includes the beacon detecting a mobile device entering the zone, in block 154. When the mobile device (and a new user) enters the zone, the beacon transmits the purpose of the line to the mobile device, as in block 156. The method 200 then returns to block 120 of the method 100 shown in FIG. 1.

In one example according of the embodiments of the disclosure, the zone or area can be a circular area (for example, a small area such as extending two feet, or a two foot radius), establishing a zone for communicating the purpose of the line to the next device.

Once a new device comes into a zone or area, the transmittal message is transmitted to the new mobile device (or phone). As a new mobile device enters the area, and thus each new device (e.g., mobile device or smartphone) joins a line, the mobile device becomes another link in the communications chain to pass along line identification data, embodied as or in the transmitted message.

Additional Examples of Implementation

The method 100, can include, at least in part, embodying steps of the method in a computer program stored in a device, for example, a computer device, or a beacon. The steps of the method, at least in part, can also be part of a computer program stored remotely (for example, in the cloud, or on a remote server), and transmitting to or controlling a beacon (or local beacon), or the method can be stored remotely utilizing cloud computing. And in a further example, the method, at least in part, can be part of a program stored on a drone, or stored remotely and communicating with a drone. In another example, the beacon can be part of or incorporated into a drone, or the drone acts as the beacon. The computer program can be located in a beacon, or other device, and can be located remotely and controlling a local beacon or device for transmitting a signal to devices of users on a line. In an alternative, a program, at least in part embodying the method 100, can be part of a remote server or computer 22 as shown in FIG. 1. The computer can include a database 26 and a program 25. The remote server or computer 22 can communicate with a beacon or local beacon, using a communication network 55, for example, the Internet. The remote server may include a database for storing data. In the presently described embodiment shown in FIG. 1, computer components, program, and interactions of example remote servers, programs, or computers are generically shown in FIG. 5 and described in the present disclosure.

Alternative Example/Embodiment Using Token

Implementation Using a Token

Figure 4:
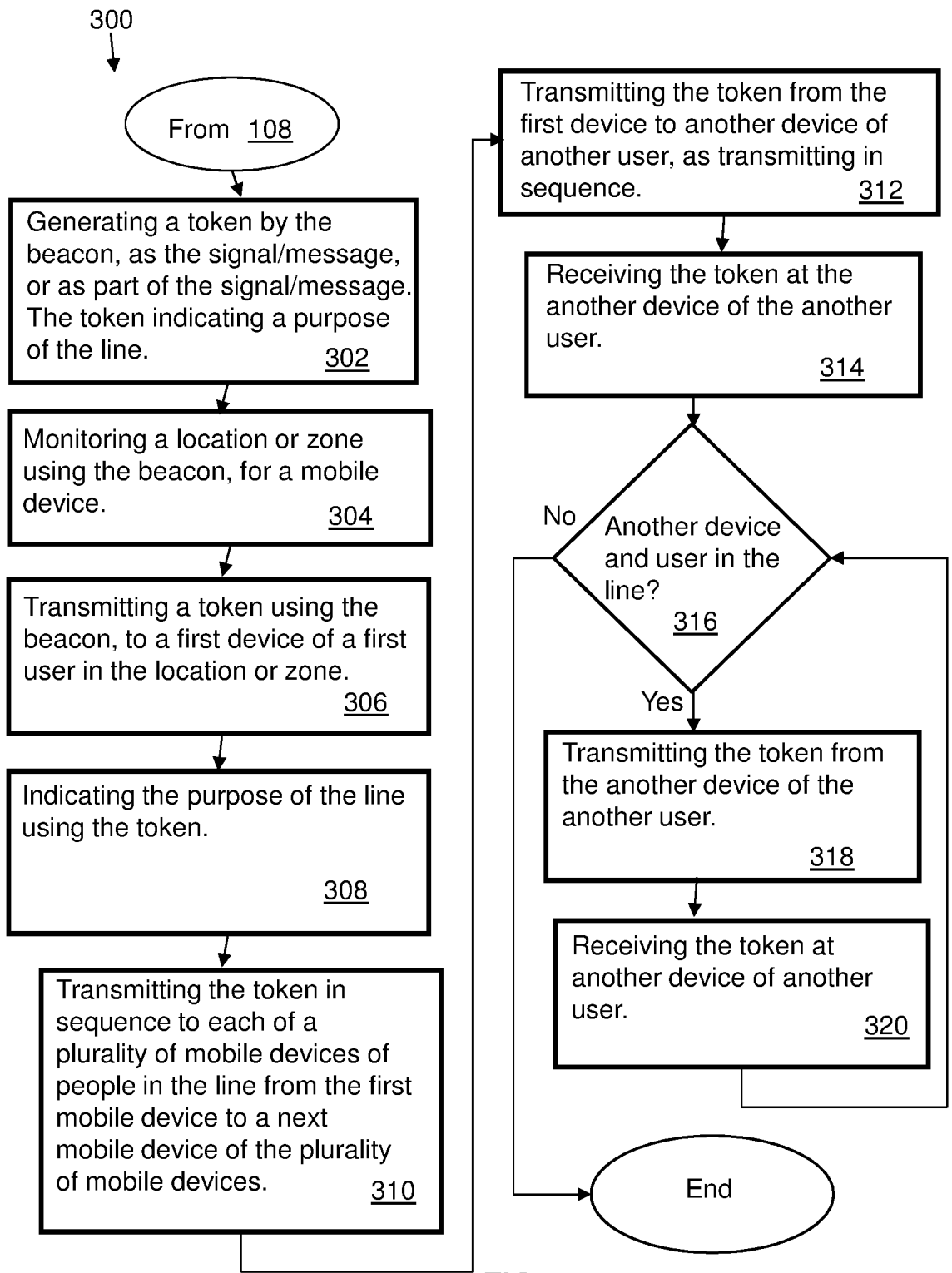
FIG. 4 is a flow chart illustrating another method continuing from the method from FIG. 2, for identifying the purpose and context of a line of people using mobile device, according to an embodiment of the disclosure.

In one embodiment according to the present disclosure, the method 100 can include, in whole or in part, transmitting a token 35 as the signal/message, or as part of the signal/message, in a near field communication (NFC). Referring to FIG. 4, a method 300 continues from block 108 of the method 100, wherein the beacon generates a token 35 as the message or as part of the message for transmitting to a device in the second location or zone 24, as in block 302. The token indicated a purpose of the line. Using the beacon, a location or zone is monitored for a mobile device to enter the location or zone, as in block 304. The method 300 includes transmitting the token from the beacon to the first mobile device 44 of the first user 42 in the second location or zone 24, as in block 306. The purpose of the line is indicated using the token (block 308). The token in transmitted sequentially from the first mobile device to the next mobile device of the plurality of mobile device, as in block 310. Thereby, relaying the token including the purpose of the line of people to multiple mobile device of respective people in the line. In one example, the token can be transmitted in response to a next mobile device entering a range or radius defined by the first mobile device, thereby initiating the transfer of the token to the next mobile device. Likewise, the next mobile device, in response to another mobile device entering the range or radius defined by the nest mobile device, can initiate transmitting the token to another mobile device, and so forth for N-number of mobile devices.

The token is transmitted in sequence including, in one embodiment of the present disclosure, transmitting the token from the first device to another device of another user, as in block 312. This can continue, as described above, by relaying or re-transmitting the token to another device for another user, for the length of the line or the number of users and devices on the line represented by device-N 48 and user-N 46.

Thus, the token is received at the another device 48 of the another user 46, as in block 314 of the method 300. Referring to block 316 of FIG. 4, the method determines if another device and another user are in the second line 40. When another device is detected at block 316, the method proceeds to transmit the token from the another device of the another user at block 318, and the message is received at another device of another user, as in block 320. When another device is not detected at block 316, the method can end. Alternatively, when another device and user in not in the line (at block 316), the method can continue to a monitoring step (for example, block 304) where the beacon monitors the second location or zone for entrance of another mobile device to transmit the token to.

In one example, the token can expire after a specified period of time or time period. The time period can be, for example, based on a time of an event, such as a time of an airplane flight, or a concert or movie time. For instance, the token expires after the time of the event start time has passed.

In another example, a vicinity locator can be used, for example, a GPS (Global Positioning Satellite) location application to locate persons on a line having a token. A person who was originally on the line can finish on the line that is reached the front of the line and completed the transaction they were on the lien for. At that point, the person leaves the line. Or a person can leave the line for any number of reasons, including having to attend to an urgent o more pressing matter. The beacon can be located using GPS, that is, a GPS application, as well as the people on the line having a token can be located using GPS or a GPS application. Thereby, a person who has left the line with a token can be distinguished from the others who still on the line with the token. The determination that a person has left the line can also be determined in conjunction with using a time stamp of when the token was transmitted. Such that a threshold period of time between the token transmittal (timestamp) and the current time can be set to determine if the token is active and the person remains on the line. When one of the people on the line with the token are determined to not be in the vicinity with other people on the line which remain in the line, the person not on the line can be concluded to have left the line. The token can be expired for the person who left the line. One or all of the tokens can be expired based on a threshold capacity of the line, such as a line waiting to enter a venue with a capacity, or a time for a show or event, or a time period for completing a transaction, such as a ticket both being open.

Figure 5:
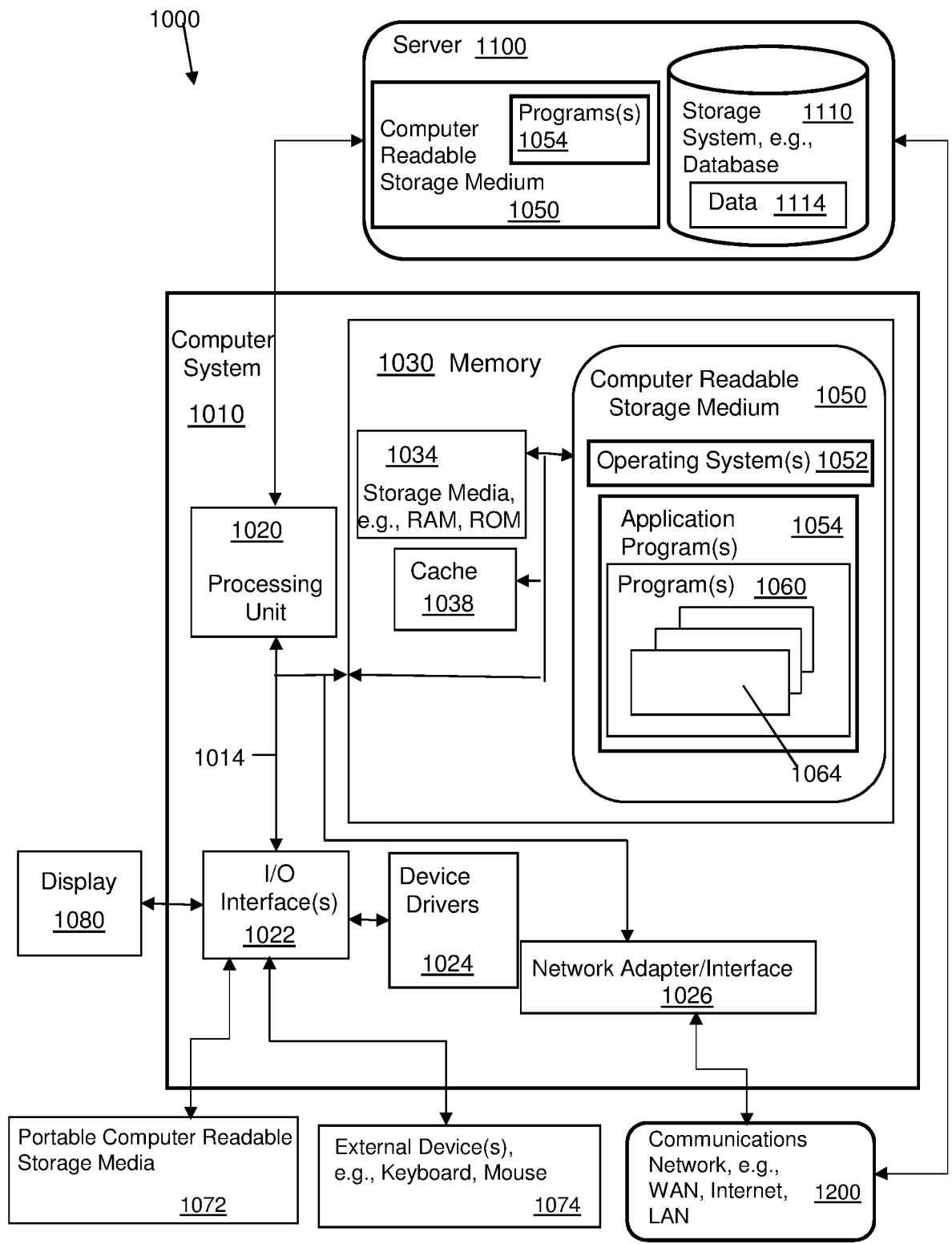
FIG. 5 is a schematic block diagram depicting a computer system according to an embodiment of the disclosure which may be incorporated, all or in part, in one or more computers or devices shown in FIG. 1, and cooperates with the system and methods shown in FIGS. 1, 2, 3, and 4.

The computer system in the system 10 and discussed herein, such as computer 22 in FIG. 1, or a remote server, can include all or part of a computer system 1000 and computer 1010 shown in FIG. 5, which discloses a generic computer system 1000 and computer 1010. It is understood that the above disclosed computers/computer systems and the computer 1010 are representative or illustrative of many alternative computer devices and are presented here as generic representations for the purposes of the embodiments of the present invention. In the embodiment discussed above, for illustrative purposes, the method of the present disclosure can be embodied in a computer program 1060 (FIG. 5) or a software application stored on the computer 1010. The computer 1010 can all or in part represent a computer, for example, the computer 22 in FIG. 1. The computer 22, in FIG. 1, is shown as a remote computer or server which can embody a program incorporating the method of the present disclosure, however, in other embodiment in accordance with the present disclosure, a computer program embodying the present method can be part of a computer system running locally in one or more of the illustrated components of the system 10 shown in FIG. 1 (as was discussed hereinabove). Further, a computer program embodying the present method can be cloud based or part of a cloud environment. In one embodiment such a cloud based system or environment can include all or part of the computer system 1000 (FIG. 5) and cloud based environment components shown in FIGS. 7 and 8. Alternative embodiments can include a computer program stored remotely (for example, on a remote server 1100 (FIG. 5)), and, for example, can be implemented as a service.

Referring to FIG. 5, a system or computer environment 1000 includes a computer system 1010 shown in the form of a generic computing device. The method 100, for example, may be embodied in a program 1060 embodied on a computer readable storage device, for example, generally referred to as memory 1030 and more specifically, computer readable storage medium 1050. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 shown in FIG. 5 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 5 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 5, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 100 (FIG. 2) (and methods shown in FIGS. 3 and 4), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 6:
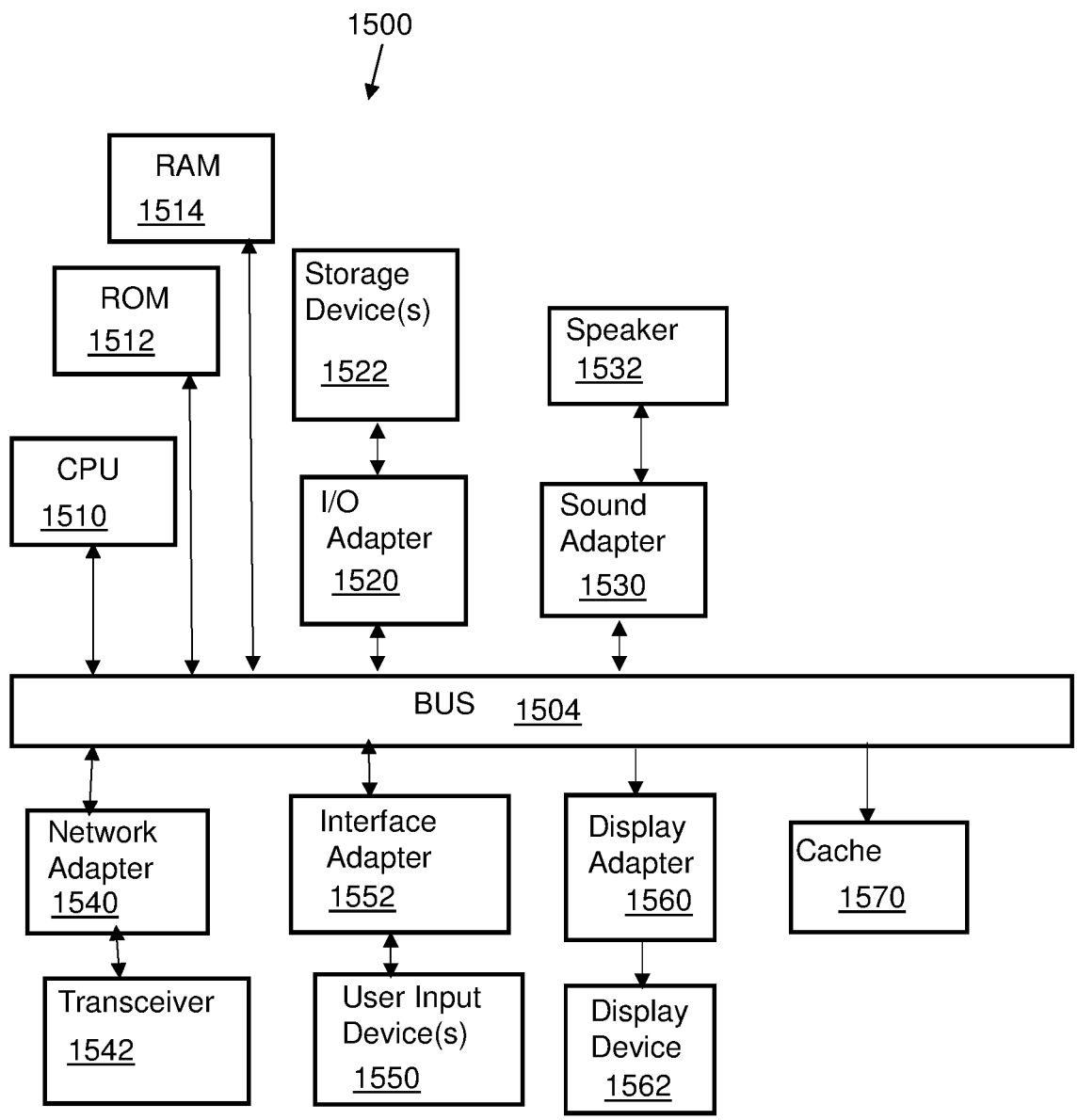
FIG. 6 is a schematic block diagram of a system depicting system components for use, all or in part, with the embodiments of the present disclosure, in accordance with one embodiment of the present disclosure.

Referring to FIG. 6, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
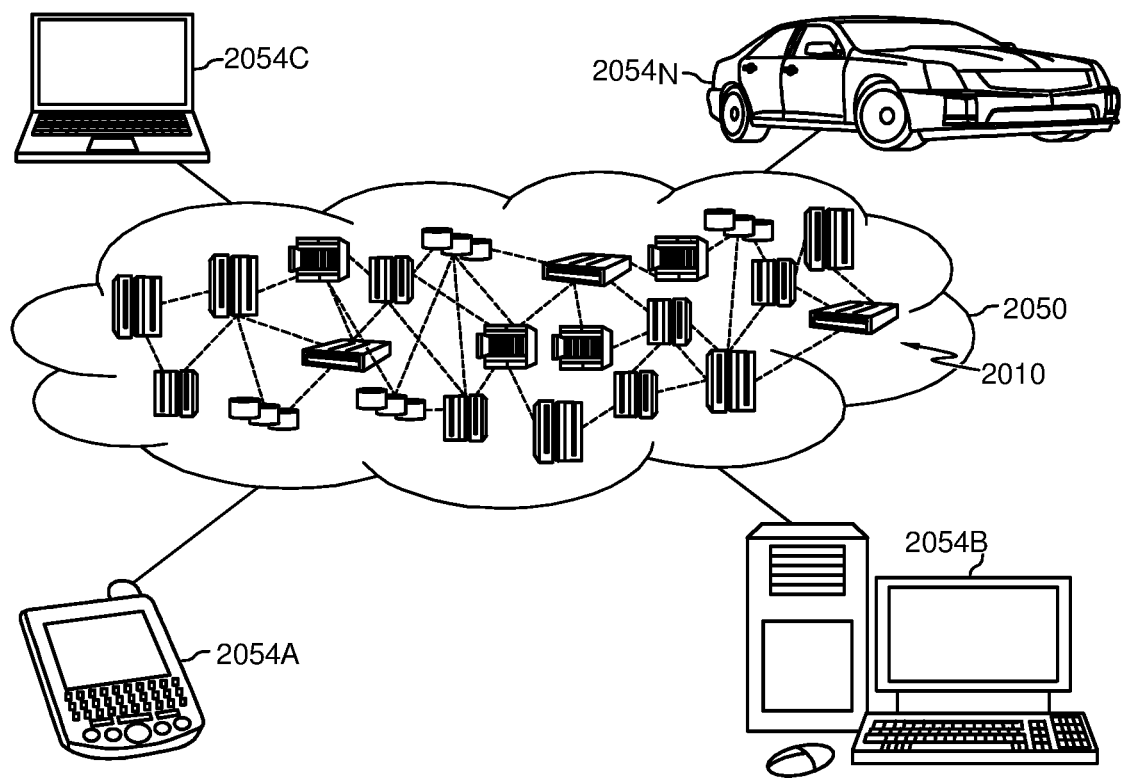
FIG. 7 is a block diagram depicting a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 7 are intended to be illustrative only and that computing nodes 2010 and cloud computing environment 2050 can communicate with any type of computerized device over any type of network and/or network addressable connection (e.g., using a web browser).

Figure 8:
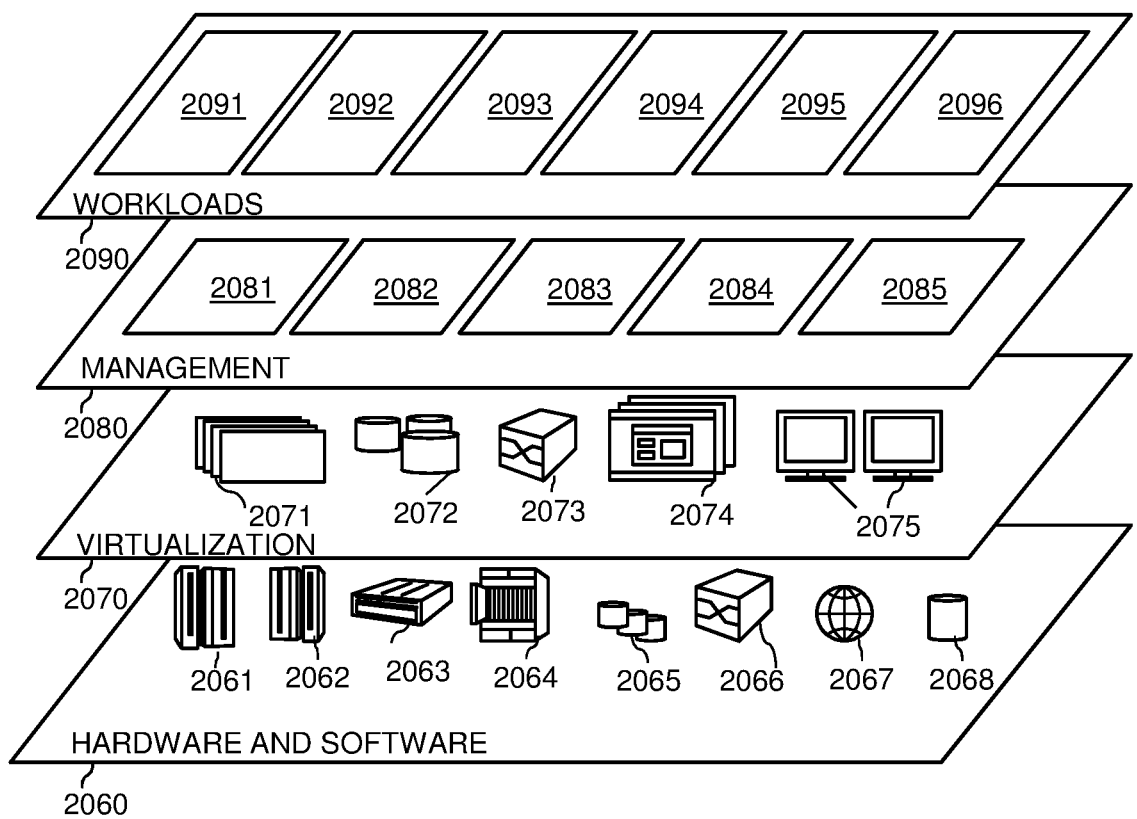
FIG. 8 is a block diagram depicting abstraction model layers according to an embodiment of the present invention.

Referring now to FIG. 8, a set of functional abstraction layers provided by cloud computing environment 2050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and assessing or identifying the purpose and context of a line of people and communicating to user devices the purpose and context of the line 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying the purpose and context of a line of people using mobile devices, comprising:
   generating a message for transmitting to one or more mobile devices, the message identifying a purpose of a line of people, and the message being transmittable using a beacon at a starting point of the line;
   transmitting the message using the beacon, the message including the purpose of the line and being receivable by a first mobile device of a first person in the line; and
   transmitting the message, in response to the first mobile device receiving the message, in sequence to each of a plurality of mobile devices belonging to people in the line, from the first mobile device to a next mobile device of the plurality of mobile devices, thereby relaying the message including the purpose of the line of people to multiple mobile devices of the people in the line, respectively.

2. The method of claim 1, wherein the transmitting of the message includes, at least in part, using an internet of things (IoT) protocol for reception and transmitting of the message by the plurality of mobile devices.

3. The method of claim 1, further comprising:
   defining a zone within a venue;
   detecting a new mobile device entering the zone; and
   transmitting the message including the purpose of the line to the new mobile device, in response to the new mobile device entering the zone, the message being transmitted using the beacon or by one of the plurality of mobile devices having received the message.

4. The method of claim 1, further comprising:
   creating a token at the beacon;
   transmitting the token from the beacon to the first mobile device; and
   transmitting the token sequentially from the first mobile device to the next mobile device of the plurality of mobile device, in response to the next mobile device being within a range of the first mobile device, and in response to another mobile device being within the range of the next mobile device.

5. The method of claim 1, wherein the beacon is part of a drone, the drone being positioned at the starting point of the line.

6. The method of claim 1, further comprising:
   generating multiple messages for each of a plurality of lines of people for transmitting to a plurality of mobile devices, respectively, of the plurality of people on the lines;
   distinguishing the lines of people from each other at least in part using the plurality of mobile devise; and
   transmitting each of the messages of the multiple messages to respective devices on an associated line of the plurality of lines.

7. The method of claim 1, further comprising:
generating multiple messages for each of a plurality of lines of people for transmitting to a plurality of mobile devices, respectively, each of the multiple messages identifying a respective purpose of each of their respective lines of people, each of the messages being transmittable using a respective beacon of a plurality of beacons positioned at a starting point of each of the plurality of lines; and
transmitting each of the messages using the short distance communication protocol using the respective beacons, the messages including the purpose of the line to a first mobile device of the first person in each of the lines, the beacons having the specified range, and the messages transmitted by the beacons being receivable by at least the first mobile devices at each of the respective lines of people.

8. The method of claim 7, further comprising:
transmitting, in sequence to each of a plurality of mobile devices belonging to people in each of the respective lines, from the first mobile device of each of the respective lines to a next mobile device of the plurality of mobile devices in each of the respective lines, thereby relaying the message for each of the respective lines including the purpose of each of the lines of people to multiple mobile devices of the people in each of the respective lines.

9. The method of claim 8, further comprising:
defining a zone within a venue for each of the plurality of lines of people;
detecting a new mobile device entering one of the plurality of zones; and
transmitting the message including the purpose of the line to the new mobile device for the respective zone, in response to the new mobile device entering the respective zone, the message being transmitted using the respective beacon or by one of the plurality of mobile devices having received the message in the respective zone.

10. The method of claim 9, wherein the detecting the new mobile device entering on of the plurality of zones is based on using a global positioning system (GPS) to located and position a mobile device in relation to one of the zones.

11. A system for identifying the purpose and context of a line of people using mobile devices, the system comprising:
a computer system comprising: a computer processor, a computer-readable storage medium, and program instructions stored on the computer-readable storage medium being executable by the processor, to cause the computer system to:
generate a message for transmitting to one or more mobile devices, the message identifying a purpose of a line of people, and the message being transmittable using a beacon at a starting point of the line, the beacon communicating with the computer system;
transmit the message using the beacon, the message including the purpose of the line and being receivable by a first mobile device of a first person in the line; and
transmit, in response to the first mobile device receiving the message, in sequence to each of a plurality of mobile devices belonging to people in the line, from the first mobile device to a next mobile device of the plurality of mobile devices, thereby relaying the message including the purpose of the line of people to multiple mobile devices of the people in the line, respectively.

12. The system of claim 11, wherein the transmitting of the message includes, at least in part, using an internet of things (IoT) protocol for reception and transmitting of the message by the plurality of mobile devices.

13. The system of claim 11, further causing the computer system to:
define a zone within a venue;
detect a new mobile device entering the zone; and
transmit the message including the purpose of the line to the new mobile device, in response to the new mobile device entering the zone, the message being transmitted using the beacon or by one of the plurality of mobile devices having received the message.

14. The system of claim 11, further causing the computer system to:
create a token at the beacon;
transmit the token from the beacon to the first mobile device; and
transmit the token sequentially from the first mobile device to the next mobile device of the plurality of mobile device, in response to the next mobile device being within a range of the first mobile device, and in response to another mobile device being within the range of the next mobile device.

15. The system of claim 11, wherein the beacon is part of a drone, the drone being positioned at the starting point of the line.

16. The system of claim 11, further causing the computer system to:
generate multiple messages for each of a plurality of lines of people for transmitting to a plurality of mobile devices, respectively, of the plurality of people on the lines;
distinguish the lines of people from each other at least in part using the plurality of mobile devise; and
transmit each of the messages of the multiple messages to respective devices on an associated line of the plurality of lines.

17. The system of claim 11, further causing the computer system to:
generate multiple messages for each of a plurality of lines of people for transmitting to a plurality of mobile devices, respectively, each of the multiple messages identifying a respective purpose of each of their respective lines of people, each of the messages being transmittable using a respective beacon of a plurality of beacons positioned at a starting point of each of the plurality of lines; and
transmit each of the messages using the short distance communication protocol using the respective beacons, the messages including the purpose of the line to a first mobile device of the first person in each of the lines, the beacons having the specified range, and the messages transmitted by the beacons being receivable by at least the first mobile devices at each of the respective lines of people.

18. The system of claim 17, further causing the computer system to:
transmit, in sequence to each of a plurality of mobile devices belonging to people in each of the respective lines, from the first mobile device of each of the respective lines to a next mobile device of the plurality of mobile devices in each of the respective lines, thereby relaying the message for each of the respective lines including the purpose of each of the lines of people to multiple mobile devices of the people in each of the respective lines.

19. The system of claim 18, further causing the computer system to:
- define a zone within a venue for each of the plurality of lines of people;
- detect a new mobile device entering one of the plurality of zones; and
- transmit the message including the purpose of the line to the new mobile device for the respective zone, in response to the new mobile device entering the respective zone, the message being transmitted using the respective beacon or by one of the plurality of mobile devices having received the message in the respective zone.

20. A computer program product for identifying the purpose and context of a line of people using mobile devices, the computer program product comprising a computer readable storage medium having program instructions embodied therewith, wherein the computer readable storage medium is not a transitory signal per se, the program instructions executable by a computer to cause the computer to perform a method, comprising:
- generating a message for transmitting to one or more mobile devices, the message identifying a purpose of a line of people, and the message being transmittable using a beacon at a starting point of the line;
- transmitting the message using the beacon, the message including the purpose of the line and being receivable by a first mobile device of a first person in the line; and
- transmitting, in response to the first mobile device receiving the message, in sequence to each of a plurality of mobile devices belonging to people in the line, from the first mobile device to a next mobile device of the plurality of mobile devices, thereby relaying the message including the purpose of the line of people to multiple mobile devices of the people in the line, respectively.

* * * * *